United States Patent
Cuevas et al.

[19]

[11] Patent Number: 5,593,180
[45] Date of Patent: Jan. 14, 1997

[54] DUAL CHAMBER INFLATOR FOR SIDE IMPACT AIR BAG

[75] Inventors: Jess A. Cuevas, Scottsdale; Mitchell P. Zakula, Tempe, both of Ariz.

[73] Assignee: TRW Inc., Lyndhurst, Ohio

[21] Appl. No.: 427,406

[22] Filed: Apr. 24, 1995

[51] Int. Cl.[6] .................................................. B60R 21/02
[52] U.S. Cl. .............................. 280/741; 280/737; 222/3; 102/530
[58] Field of Search ...................................... 280/741, 736, 280/737, 728.1, 730.2; 222/3, 5; 102/530, 531

[56] References Cited

U.S. PATENT DOCUMENTS

| | | | |
|---|---|---|---|
| 3,724,870 | 4/1973 | Kurokawa et al. | 280/741 |
| 3,806,153 | 4/1974 | Johnson | 280/728.1 |
| 3,862,767 | 1/1975 | Chute | 280/728.1 |
| 3,884,497 | 5/1975 | Massengill et al. | 280/737 X |
| 4,215,878 | 8/1980 | Hirbod | 280/737 X |
| 4,275,901 | 6/1981 | Okada | 280/741 |
| 5,060,973 | 10/1991 | Giovanetti | 280/730 |
| 5,076,607 | 12/1991 | Woods et al. | 280/737 |
| 5,094,475 | 3/1992 | Olsson et al. | 280/741 |
| 5,131,680 | 7/1992 | Coultas et al. | 280/737 |
| 5,242,194 | 9/1993 | Popek | 280/737 |
| 5,273,312 | 12/1993 | Coultas et al. | 280/732 |
| 5,348,344 | 9/1994 | Blumenthal et al. | 280/741 |
| 5,388,859 | 2/1995 | Fischer et al. | 280/737 |

Primary Examiner—Christopher P. Ellis
Attorney, Agent, or Firm—Tarolli, Sundheim, Covell, Tummino & Szabo

[57] ABSTRACT

An air bag inflator (20, 200) comprises first and second tubes (24, 26, 204, 206) defining respective first and second chambers (44, 46, 244, 246) for storing inflation fluid under pressure. A manifold (22, 202) has a manifold passage (42, 222). Each of the first and second tubes (24, 26, 204, 206) is secured to the manifold (22, 202) with the first and second chambers (24, 26, 204, 206) in fluid communication with the manifold passage (42, 222). A diffuser housing (28, 208) is fixed to the manifold (22, 202) and defines a third chamber (104, 242) for fluid communication with the manifold passage (42, 222). Passages (106, 244) in the diffuser housing (28, 208) provide fluid communication between the third chamber (104, 242) and an air bag. A rupturable wall (142, 248) is fixed to the diffuser housing (28, 208) to block fluid communication of the third chamber (104, 242) with the manifold passage (42, 222). An actuatable initiator (122, 246) is in the third chamber (104, 242) for, upon actuation, rupturing the wall (142, 248) to enable fluid communication of the third chamber with the manifold passage (42, 222).

20 Claims, 3 Drawing Sheets

DUAL CHAMBER INFLATOR FOR SIDE IMPACT AIR BAG

BACKGROUND OF THE INVENTION

1. Technical Field

The present invention relates to a source of inflation fluid for an inflatable vehicle occupant protection system. More particularly, the present invention relates to an inflator for inflating a side impact air bag.

2. Description of the Prior Art

U.S. Pat. No. 5,094,475 discloses a side impact air bag system having an elongated gas generating unit. The gas generating unit includes a diffuser tube having axially opposite end portions received within a respective one of a pair of gas generating elements. Each of the gas generating elements includes a housing containing an ignitable gas generating material, such as cellulose nitrate. The gas generating material, upon ignition, produces an inflation gas, such as carbon monoxide. The inflation gas breaks a seal on the housing and flows into the diffuser tube. The inflation gas then fills and inflates an air bag so that it extends from a part on the side of a vehicle, such as a door.

U.S. Pat. No. 3,806,153 discloses an inflator for an air bag system. The inflator includes a container defining a closed chamber for storing an inflation fluid under pressure. An end of a charge chamber housing is threaded into an end of the container. The charge chamber contains an ignitable propellant material and a movable piston. Upon ignition of the ignitable material, the piston moves to break a closure located between the charge chamber housing and the container to enable inflation fluid to flow from the container through passages in the charge chamber housing and to an air bag. The gas from ignition of the propellant material also flows through a passage in the piston to heat the inflation fluid in the container.

SUMMARY OF THE INVENTION

The present invention is directed to an inflator for a vehicle side impact air bag. The inflator provides a relatively large volume of inflation fluid to inflate the air bag. The inflator has a thickness which is no greater than known side impact air bag inflators so it can be mounted in a door or a side panel of the vehicle.

The inflator comprises inflation fluid storage means for storing inflation fluid under pressure. The inflation fluid storage means is initially closed and is at least partially defined by first and second tubes defining respective first and second chambers for containing inflation fluid. A third chamber can be placed in fluid communication with the inflation fluid storage means when the inflation fluid storage means is open. The third chamber can also be placed in fluid communication with an air bag. An actuatable initiator is located in the third chamber for, when actuated, opening the inflation fluid storage means.

The inflator also comprises a manifold having a manifold passage. Ends of the first and second tubes are fixed to the manifold. The first and second chambers are in fluid communication with the manifold passage. The manifold passage may be placed in fluid communication with the third chamber. Means is provided for blocking fluid communication between the third chamber and the manifold passage. The blocking means is located between the third chamber and the manifold passage. The blocking means comprises a rupturable wall which ruptures upon actuation of the initiator.

The first and second tubes are located on the same side of the manifold opposite the third chamber and extend away from the manifold. The first and second tubes preferably extend away from the manifold at an acute angle relative to one another, but may alternately extend in a direction substantially parallel to one another. The tubes are preferably friction welded to the manifold.

The inflator also includes a diffuser housing defining the third chamber. The diffuser housing includes passages extending between the third chamber and the air bag to direct inflation fluid into the air bag.

BRIEF DESCRIPTION OF THE DRAWINGS

Further features and advantages of the present invention will become apparent to those skilled in the art to which the present invention relates from reading the following specification with reference to the accompanying drawings, in which.

DESCRIPTION OF PREFERRED EMBODIMENTS

Figure 1:
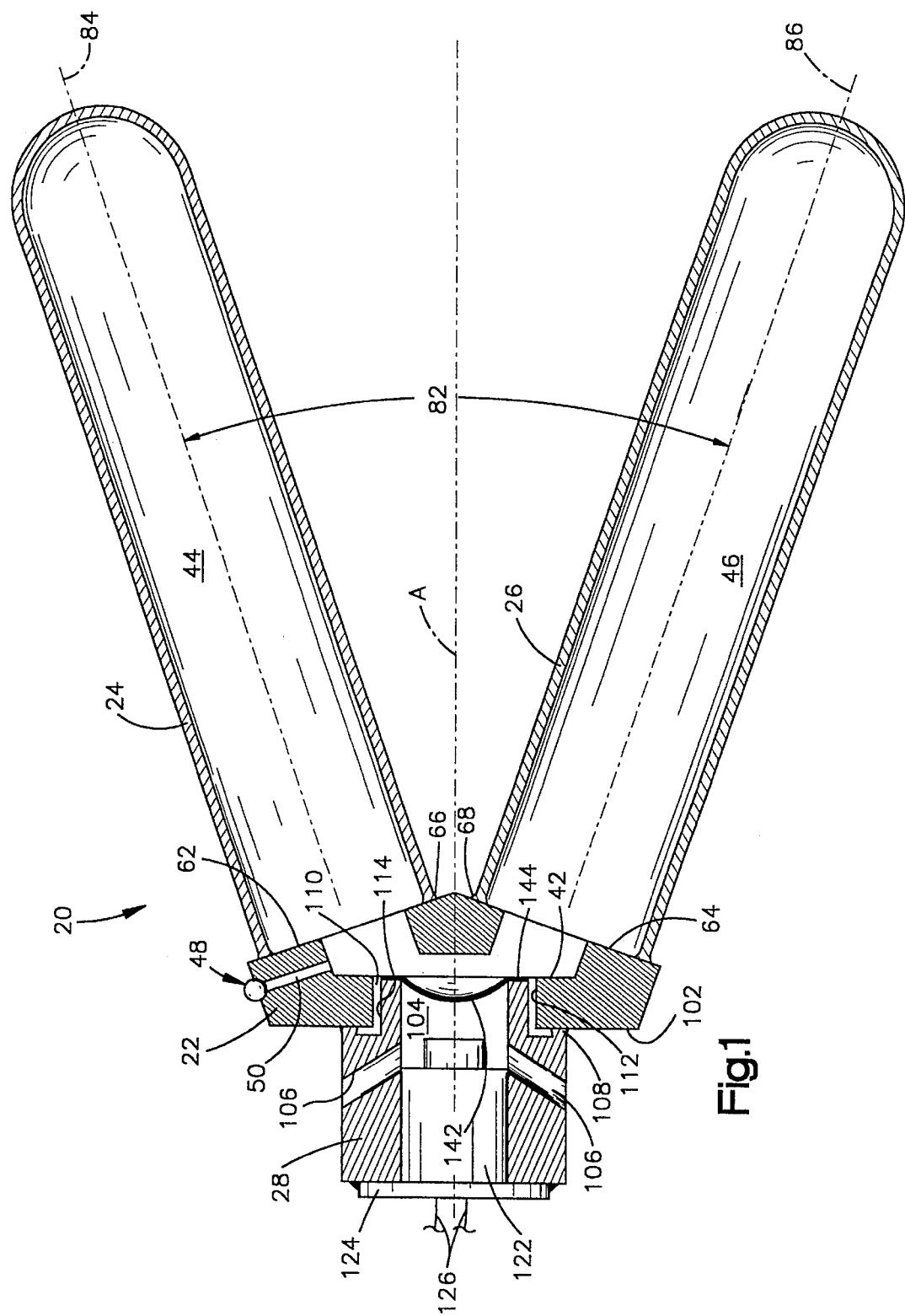
FIG. 1 is a schematic longitudinal cross-sectional view of an inflator according to one embodiment of the invention.

A hybrid type of inflator 20, according to one embodiment of the present invention, is illustrated in FIG. 1. The inflator 20 is particularly suitable for use in a vehicle side impact air bag system. The inflator 20 mounts within a door or a side panel of a vehicle and provides a relatively large volume of inflation fluid to inflate a side impact air bag (not shown).

The inflator 20 includes a manifold 22, a pair of tubes 24, 26 connected to one side of the manifold, and a diffuser housing 28 connected to another side of the manifold opposite the pair of tubes. The first and second tubes 24, 26 are preferably made from a metal, such as steel or aluminum, and define first and second chambers 44, 46, respectively. Each of the tubes 24, 26 also defines a substantially equal volume portion of a larger closed container for storing and inflation fluid under pressure. It will be apparent that two tubes defining different volume portions of the larger container can be used. The inflation fluid is preferably a non-ignitable and inert gas, such as argon or nitrogen. Upon opening the closed container, the inflation fluid flows through the diffuser housing 28 and inflates the air bag.

The manifold 22 is made from a metal, such as steel or aluminum, and is centered on a longitudinal central axis A of the inflator 20. The manifold 22 includes a manifold passage 42 extending normal to the axis A. The manifold 22 also includes a fill closure 48 that closes one end of a fill passage 50 communicating with an end portion of the manifold passage 42. The fill passage 50 is used to fill the chambers 44 and 46 with pressurized inflation fluid. On the right side of the manifold 22, as viewed in FIGS. 1 and 2, a pair of surfaces 62, 64 extend at an obtuse angle relative to one another.

The open ends of the tubes 24, 26 engage and are welded at respective weld securements 66, 68, preferably by a friction welding process, to the respective surfaces 62, 64 of the manifold 22. The first and second chambers 44, 46 are in fluid communication with opposite end portions of the manifold passage 42. The manifold passage 42, thus, forms another portion of the closed container for the inflation fluid.

The obtuse angle formed by the surfaces 62, 64 provides a space between the tubes 24, 26 to permit the tubes to be held by a collet during the friction welding operation. The tubes 24, 26 extend from the manifold 22 at an acute angle 82, defined by their respective longitudinal central axes 84, 86, relative to one another. The acute angle 82 is bisected by the axis A of the inflator 20.

Figure 2:
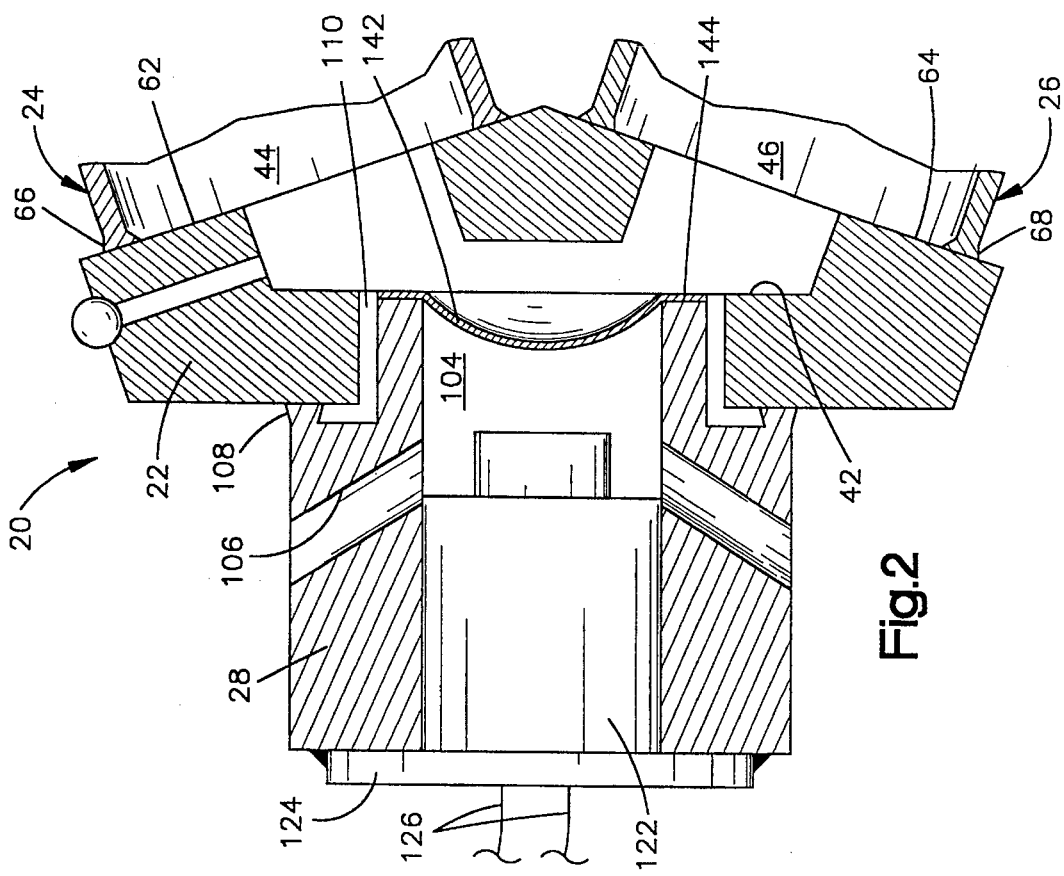
FIG. 2 is an enlarged view of a portion of the inflator in FIG. 1.

The diffuser housing 28 is a tubular member that engages and is fixed to a surface 102 at the left side of the manifold 22, as viewed in FIGS. 1 and 2, opposite the surfaces 62, 64 to which the tubes 24, 26 are fixed. The diffuser housing 28 defines a central passage or third chamber 104 for direct fluid communication with the manifold passage 42. The third chamber 104 is also in indirect fluid communication, through the manifold passage 42, with the first and second chambers 44, 46. The diffuser housing 28 has a plurality of passages 106 extending substantially radially of the axis A between the third chamber 104 and the air bag. The passages 106 direct the flow of inflation fluid from the third chamber 104 into the air bag in a predetermined pattern and direction.

The diffuser housing 28 has an annular outer shoulder that is welded to the manifold 22 at weldment 108, preferably by a friction welding operation. An annular space 110 is provided between an inner cylindrical surface 112 of the manifold 22 and an outer cylindrical surface 114 of the diffuser housing 28 which project axially beyond the shoulder. The annular space 110 assures that contact between the manifold 22 and the diffuser housing 28 only occurs in the region which will form the weldment 108, during the friction welding operation.

An actuatable initiator 122 is fixed to the end of the diffuser housing 28 opposite the manifold 22 and is located in the third chamber 104. The initiator 122 has a flange 124 attached in a suitable manner, such as by laser beam welding, to the housing 28 to seal one end of the third chamber 104. The initiator 122 extends into the third chamber 104 only to a point that is downstream of the passages 106 in the diffuser housing 28 so the body of the initiator will not interfere with any flow through the passages.

A pair of lead wires 126 extend from the initiator 122 and electrically communicate with a sensor (not shown). The sensor generates an electrical signal to actuate the initiator 122 upon detecting a side impact above a predetermined magnitude. Upon actuation, the initiator 122 produces combustion products which are introduced into the third chamber 104.

A rupturable closure member 142 (FIG. 2) is fixed to an annular end surface 144 of the diffuser housing 28 to seal the other end of the third chamber 104. The closure member 142 blocks the flow of inflation fluid from the manifold passage 42 to the third chamber 104. Thus, the closure member 142 forms another portion of the closed container.

Figure 3:
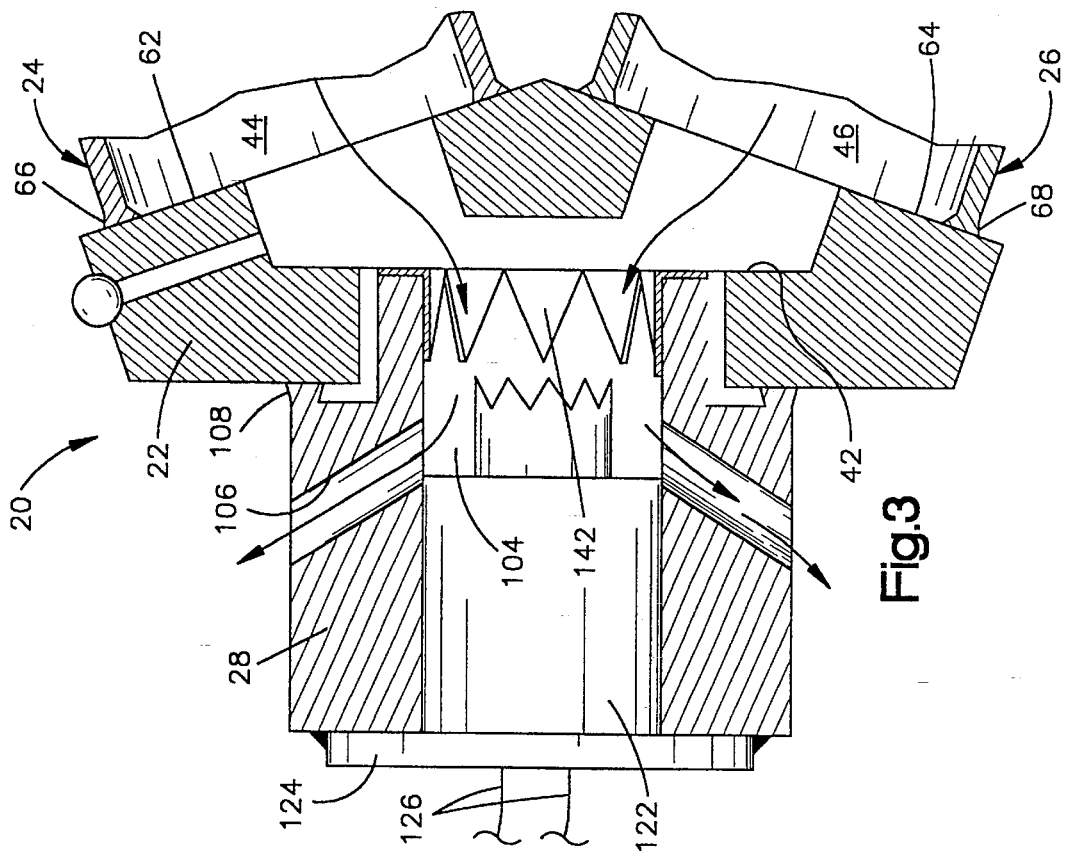
FIG. 3 is a view similar to FIG. 2 with parts illustrated in different positions.

The closure member 142 is preferably scored to define weakened areas which break, as illustrated in FIG. 3, in a predetermined manner when the combustion products that are introduced into the third chamber 104 by actuation of the initiator 122 contact the closure member. Upon breaking, the closure member 142 permits the pressurized inflation fluid to flow from the first chamber 44, the second chamber 46 and the manifold passage 42 into the third chamber 104 in the diffuser housing 28. The inflation fluid then flows from the third chamber 104 through the passages 106 into the air bag to inflate the air bag.

Figure 4:
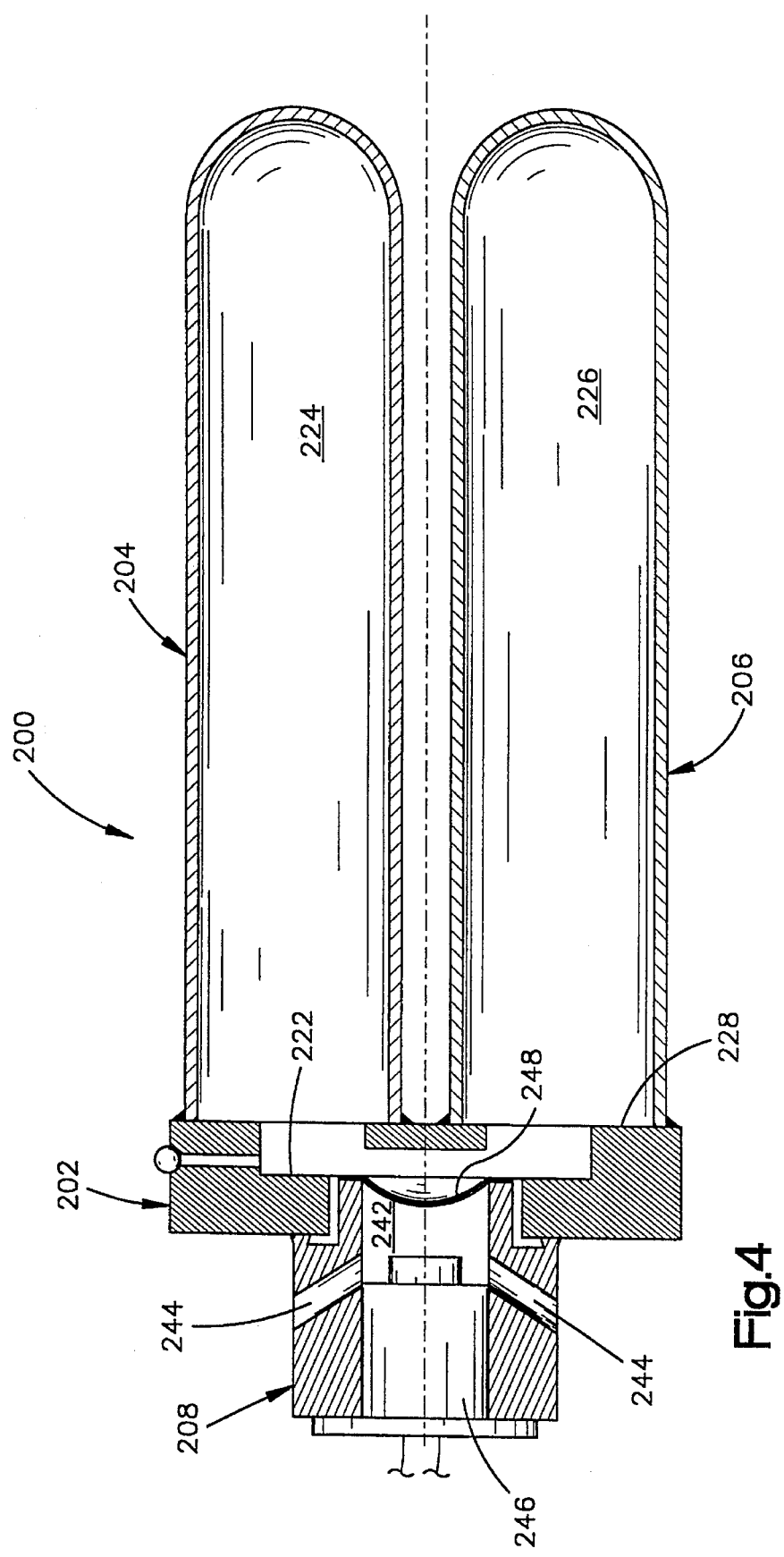
FIG. 4 is a schematic longitudinal cross-sectional view of an inflator according to another embodiment of the invention.

A hybrid type of inflator 200, according to another embodiment of the present invention, is illustrated in FIG. 4 for use in a vehicle side impact air bag system. The inflator 200 is similar in construction and operation to the inflator 20, illustrated in FIG. 1. The inflator 200 is mounted in a door or a side panel of the vehicle and provides a relatively large volume of inflation fluid to inflate an air bag. The inflator 200 includes a manifold 202, a pair of tubes 204, 206 connected to one side of the manifold, and a diffuser housing 208 connected to another side of the manifold opposite the pair of tubes.

Each of the pair of tubes 204, 206 defines a respective chamber 224, 226 for containing an inflation fluid under pressure to inflate an air bag. The manifold 202 includes a manifold passage 222. The manifold 202 has a surface 228 contained in a plane on one side of the manifold. The open ends of the tubes 204, 206 engage and are welded to the surface 228 of the manifold 202. The chambers 224, 226 are in fluid communication with opposite ends of the manifold passage 222. The tubes 204, 206 extend from the manifold 202 in the same direction and are substantially parallel to one another.

The diffuser housing 208 is fixed to a side of the manifold 202 opposite the surface 228 to which the tubes 204, 206 are attached. The diffuser housing 208 defines a chamber 242 for fluid communication with the manifold passage 222. A plurality of passages 244 are located in the diffuser housing 208 and are in fluid communication with the chamber 242 to direct the flow of inflation fluid into the air bag.

An actuatable initiator 246 is fixed to the diffuser housing 208 in the chamber 242. The initiator 246 produces combustion products, upon actuation, which are introduced into the chamber 242. A rupturable closure member 248 is fixed to the diffuser housing 208 to block the flow of inflation fluid from the manifold passage 222 when the closure member 248 is unruptured. When the closure member 248 is ruptured, inflation fluid flows from the chambers 224, 226 and manifold passage 222 into the chamber 242. The combustion products produced by actuation of the initiator 246 rupture the closure member 248.

Operation

During an emergency situation encountered by the vehicle, such as a collision from the side, an electrical signal indicative of a side impact occurring with a magnitude that requires inflation of an air bag is communicated to the initiator 122 or 246. The initiator 122 or 246 is actuated and produces combustion products which rupture the closure member 142 or 248 to allow fluid communication between the manifold passage 42 or 222 and the chamber 104 or 242. The inflation fluid is then allowed to flow from the chamber 104 or 242 through the passages 106 or 244 in the diffuser housing 28 or 208 and into the air bag to inflate the air bag.

From the above description of preferred embodiments of the invention, those skilled in the art will perceive improvements, changes and modifications. Such improvements, changes and modifications within the skill of the art are intended to be covered by the appended claims.

Having described the invention, the following is claimed:
1. An air bag inflator comprising:
first and second tubes defining respective first and second chambers for storing inflation fluid under pressure;

a manifold defining a manifold passage;

means for securing an end of each of said first and second tubes to said manifold with said chambers extending at an acute angle relative to one another, each of said first and second chambers being in fluid communication with said manifold passage;

a housing fixed to said manifold defining a third chamber for fluid communication with said manifold passage;

a rupturable wall fixed to said housing and blocking fluid communication of said third chamber with said manifold passage;

diffuser passages in said housing for providing fluid communication between said third chamber and an air bag; and an actuatable initiator in said third chamber for rupturing said wall, upon actuation, to enable fluid communication between said third chamber and said manifold passage.

2. The air bag inflator set forth in claim 1 wherein said diffuser passages are in fluid communication with said third chamber at a location between said initiator and said manifold passage.

3. The air bag inflator set forth in claim 2 wherein said wall is fixed to an end of said housing at a location between said manifold passage and said third chamber.

4. The air bag inflator set forth in claim 1 wherein said securing means comprises a friction weld.

5. An air bag inflator comprising:

first and second tubes defining respective first and second chambers for storing inflation fluid under pressure;

a manifold defining a manifold passage;

each of said first and second tubes having ends fixed to said manifold, said first and second chambers being in fluid communication with said manifold passage;

means for defining a third chamber that can be placed in fluid communication with said manifold passage, said third chamber being in fluid communication with an air bag;

means blocking fluid communication between said third chamber and said manifold passage; and an actuatable initiator for, upon actuation, enabling fluid communication between said third chamber and said manifold passage.

6. The air bag inflator set forth in claim 5 wherein said first and second tubes extend from said manifold in a direction opposite the direction said third chamber extends from said manifold.

7. The air bag inflator set forth in claim 6 wherein said first and second tubes extend in a direction substantially parallel to one another.

8. The air bag inflator set forth in claim 6 wherein said first and second tubes are disposed at an acute angle relative to one another.

9. The air bag inflator set forth in claim 8 wherein said ends of said first and second tubes are friction welded to said manifold.

10. The air bag inflator set forth in claim 5 wherein said initiator is located in said third chamber.

11. The air bag inflator set forth in claim 5 further including a diffuser housing defining said third chamber and fixed to said manifold, said diffuser housing having a passage to direct inflation fluid into the air bag.

12. The air bag inflator set forth in claim 11 wherein said blocking means comprises a rupturable wall fixed to said diffuser housing at a location between said third chamber and said manifold passage.

13. An air bag inflator comprising:

inflation fluid storage means for storing inflation fluid under pressure, said inflation fluid storage means being initially closed and at least partially defined by first and second tubes defining respective first and second chambers for containing inflation fluid, said first and second chambers being in fluid communication when said fluid storage means is closed;

means for defining a third chamber for fluid communication with said inflation fluid storage means when said inflation fluid storage means is open and for fluid communication with an air bag; and an actuatable initiator located in said third chamber for, when actuated, opening said inflation fluid storage means.

14. The air bag inflator set forth in claim 13 further including a manifold having a manifold passage for defining another portion of said inflation fluid storage means and for providing fluid communication between said inflation fluid storage means and said third chamber.

15. The air bag inflator set forth in claim 14 further including a diffuser housing fixed to said manifold, said diffuser housing having a passage to direct inflation fluid into the air bag and said diffuser housing defining said third chamber.

16. The air bag inflator set forth in claim 15 wherein said closed inflation fluid storage means is further defined by a rupturable wall fixed to said diffuser housing at a location between said manifold passage and said third chamber.

17. The air bag inflator set forth in claim 14 wherein said first and second tubes extend in a direction from said manifold opposite the direction said third chamber extends from said manifold.

18. The air bag inflator set forth in claim 17 wherein said first and second tubes extend from said manifold in a direction substantially parallel to one another.

19. The air bag inflator set forth in claim 17 wherein said first and second tubes are extended from said manifold at an acute angle relative to one another.

20. The air bag inflator set forth in claim 19 wherein said tubes are friction welded to said manifold.

\* \* \* \* \*